Jan. 8, 1957   J. L. WHITAKER   2,776,638
INDICATOR FOR DAIRY DELIVERY SERVICE
Filed Oct. 5, 1953
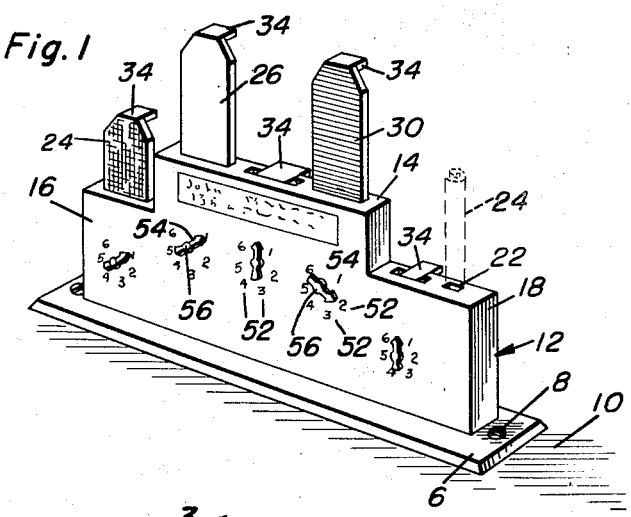
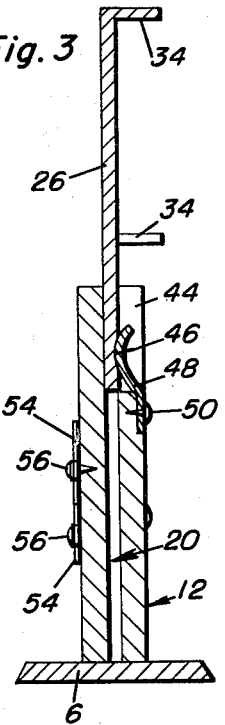
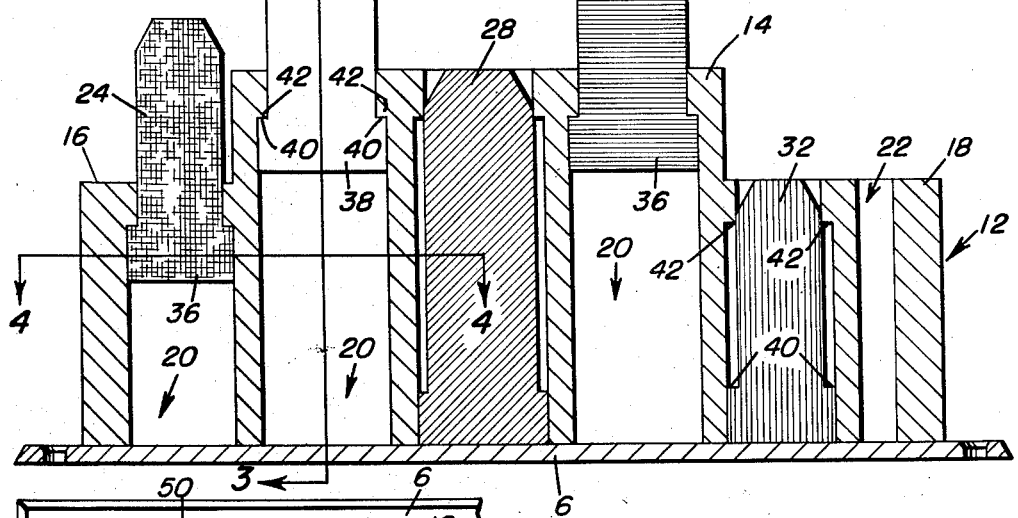
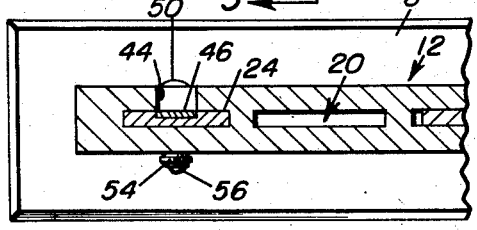
Jesse L. Whitaker
INVENTOR.

United States Patent Office 2,776,638
Patented Jan. 8, 1957

2,776,638

INDICATOR FOR DAIRY DELIVERY SERVICE

Jesse L. Whitaker, Great Falls, Mont.

Application October 5, 1953, Serial No. 383,989

3 Claims. (Cl. 116—130)

The present invention relates to a simple, practical, and satisfactory structural device or contrivance which is provided with systematically arranged facilities functioning to provide a conspicuous ordering device which is helpful to the housewife on the one hand, and to the route deliveryman on the other hand.

More specifically, the invention has to do with a novelly constructed indicator which may well be distributed by a dairy to regular customers and through the medium of which the housewife may adjust and appropriately set the same so that the deliveryman may glance at it from a nearby point of vantage and, in many instances, without alighting from the delivery truck, ascertain the exact nature of the delivery to be made and may then act accordingly.

It is a matter of common knowledge that so-called window display cards for use by milkmen, icemen, breadmen and so on, are in everyday use. There is a widespread and acknowledged need for mutual cooperation between home owners and service men in the categories mentioned and consequently there are many different kinds of indicators and "cards" in use. It is the obvious purpose of the instant invention to structurally, functionally, and otherwise improve upon known forms of prior art indicators and, in doing so, to provide one in which makes, users and sellers will find their respective requirements and needs effectually complied with and aptly met.

In carrying out a preferred embodiment of the invention and reviewing the same in a general way, it will be seen that it is characterized by a base having a series of dials, each with dialing numbers and quantity denoting pointers therefor, and a plurality of projectible and retractible indicator slides, one designating milk, another one cream, another butter and so on, said slides being selectively set for use by the housewife and each slide being distinctively marked in a manner to make the nature of the order unmistakably clear to the deliveryman. More explicitly, the invention, in its preferred form, comprises a base having an upstanding panel provided with hollow portions each defining a vertically elongated sheath, a slide operatively mounted in each sheath, each slide and companion sheath having cooperating stop shoulders to limit the upward sliding movement of the slide, a spring clip on each sheath to frictionally contact and retain the associated slide in its useful elevated position, said slides being each distinctively colored for selective and unmistakable functioning, and a readily viewable dial mounted on the front side of each sheath and comprising consecutively arranged quantity signifying numbers and a rotary pointer cooperable with said numbers.

Other objects, features and advantages will become more readily apparent from the following description and the accompanying sheet of illustrative drawings.

In the drawings, wherein like numerals are employed to designate like parts throughout the views:

Figure 1 is a perspective view of a dairy delivery service indicator device constructed in accordance with the principles of the invention and showing the manner in which the same may be installed and used;

Figure 2 is a view on a larger scale with the parts in section and elevation;

Figure 3 is a view at right angles on the vertical line 3—3 of Figure 2, looking in the direction of the arrows; and Figure 4 is a fragmentary horizontal section on the line 4—4 of Figure 2, looking in the direction of the arrows.

By way of introduction to the detailed description, it is to be pointed out that a device of the type herein revealed will, of course, be installed or erected so that it will be handy for use by the housewife. Usually, it is located indoors, but conspicuously displayed at a point of vantage, so that it can be seen by the milkman from the nearby street. This means that it will be, as these indicators usually are, placed in a position easy-to-see in association with a front window or an alley window, as the case may be. Or, it may be installed on a porch. In apartment houses it may be positioned in the hallways and corridors so that the mutual purposes will be served.

The device, as before indicated, comprises an appropriate base 6, which is fastened by screws or the like 8 to a support surface 10. The base is usually a flat plate and is here provided with an upstanding upright which may be generally referred to as a vertical panel 12. The panel is hollowed out at various places to define a plurality of individual sheaths with the idea in mind that, by providing a number of slides, one can order cream, milk, chocolate milk, buttermilk, whipping cream, butter, eggs, etc. A preferred embodiment of the panel is the one shown wherein the central portion forms a sort of a riser 14, the end portions are stepped-down as at 16 and 18. It will be obvious, however, that these are primarily matters of design and appearance. The basic idea is that the panel is divided into vertical chambers or hollowed-out portions which define individual sheaths. More specifically in Figure 2, one hollow space is denoted by the numeral 20 and the rest of the spaces are likewise denoted except the end space 22, which is used for insertion of special notes and explanatory instructions, as shown at 24 in the Figure 1 for the mutual aid of housewives and deliverymen. Since each sheath is the same in construction a description of one will suffice for all. However, it is to be pointed out in this connection that there are a number of slides and complemental sheaths and the slides vary in size, if desired, and they are conspicuously colored, as for example, the slide 24 may be yellow and indicative of cream, the slide 26 white for milk, the slide 28 brown or similarly colored for chocolate milk, the slide 30 blue for buttermilk, and the slide 32 red for whipping cream, and so on. As stated, however, each sheath and its slide is the same in construction and to this end the slide is a miniature flat paddle or plate which operates up and down in the sheath and is wholly confined in the sheath when it is not in use. The upper end of each slide is provided with a lateral finger grip 34. The lower end is increased in width as at 36 and this serves to provide not only a suitable base but a pair of shoulders 40—40 to engage companion stop shoulders 42—42 formed in the upper open end of the companion sheath. On the back wall the sheath is provided with a clearance notch 44 for the curvate free end portion 46 of the retaining spring 48 which latter is suitably fastened in place at 50. The spring engages in a seat provided therefor and holds the slide in its up-signaling or indicating position. On each sheath complemental dialing means is provided and this is on the front wall. The dialing means is made up of a dial characterized by consecutive numbers running from 1 to 6 and denoted by the numeral 52 here. A pointer 54 is provided and this is pivoted for rotation as at 56 and it cooperates with the numbers to denote the number of quarts desired by the housewife.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For mutual use by a housewife and a route dairy products deliveryman, a readily available, visible, and conspicuous ordering device comprising a base having an upstanding panel provided with hollow portions each defining each sheath closed at its bottom and open at its top, a vertically elongated sheath, a slide operatively mounted in each sheath, each slide and companion cooperable portion of its respective sheath having cooperating stop shoulders to limit the upward sliding movement of the slide, the downward sliding movement of each sheath being limited by said base, a spring clip accessibly mounted on each sheath to frictionally contact and retain the associated slide in its useful elevated position, said slides being each distinctively colored for selective and unmistakable functioning, and a readily viewable quantity ordering means on the front side of said panel in alignment with each sheath and comprising consecutively arranged quantity signifying numbers and a pointer cooperable with said numbers.

2. The structure defined in claim 1 and wherein and in addition thereto each sheath is proportional in size and shape with its complemental slide so that the latter is aptly housed and concealed therein when "down" and not in use, the upper end of each slide having a lateral finger-grip for handily catching hold of and lifting the slide to its "up" position.

3. For mutual use by a housewife and a route dairy products deliveryman, a readily available, visible, and conspicuous ordering device comprising a base having a series of spaced apart independent indicators each with circumferentially spaced order numbers and a manually regulable quantity denoting pointer for the numbers of each indicator, and a plurality of projectible and retractible indicator slides, one designating milk, another one cream, another butter, and so on, said slides being selectively set for use by the housewife and each slide being distinctively marked in a manner to make the nature of the order unmistakably clear to the deliveryman, each slide being operable in a sheath provided therefor and in which it is entirely concealed when not in use, and spring means whereby each slide is temporarily maintained in its projected position when intentionally moved to and set in said projected position by the housewife.

References Cited in the file of this patent
UNITED STATES PATENTS

| | | |
|---|---|---|
| 646,914 | Peek | Apr. 3, 1900 |
| 1,903,266 | Koch | Mar. 28, 1933 |
| 2,170,033 | Pettinger | Aug. 22, 1939 |
| 2,543,609 | Stark | Feb. 27, 1951 |